(12) United States Patent
Ho (10) Patent No.: US 8,851,301 B1
(45) Date of Patent: Oct. 7, 2014

(54) BICYCLE STAND

(71) Applicant: Jern-Shorg Ho, Chang Hua (TW)

(72) Inventor: Jern-Shorg Ho, Chang Hua (TW)

(73) Assignee: Ye Chou Industry Co., Ltd., Chang Hua (TW)

( * ) Notice: Subject to any disclaimer, the term of this patent is extended or adjusted under 35 U.S.C. 154(b) by 0 days.

(21) Appl. No.: 13/921,263

(22) Filed: Jun. 19, 2013

(51) Int. Cl.
*A47F 7/00* (2006.01)
*B62H 3/04* (2006.01)

(52) U.S. Cl.
CPC ...................................... *B62H 3/04* (2013.01)
USPC .......................................................... 211/20

(58) Field of Classification Search
CPC ........ B62H 3/00; B62H 3/08; B62H 2003/00; B62H 3/04
USPC ..................................................... 211/17–22
See application file for complete search history.

(56) References Cited

U.S. PATENT DOCUMENTS

| | | | | | |
|---|---|---|---|---|---|
| 292,163 | A | * | 1/1884 | Fry ................................... | 211/21 |
| 518,325 | A | * | 4/1894 | Mueller ........................... | 211/22 |
| 547,412 | A | * | 10/1895 | Boerum .......................... | 211/17 |
| 576,002 | A | * | 1/1897 | Terell .............................. | 211/22 |
| 578,886 | A | * | 3/1897 | Fevre ............................... | 211/22 |
| 602,665 | A | * | 4/1898 | McBurney ...................... | 211/22 |
| 614,432 | A | * | 11/1898 | Austin ............................. | 211/5 |
| 635,435 | A | * | 10/1899 | Fowler ............................ | 211/22 |
| 2,803,349 | A | * | 8/1957 | Talbot ............................. | 211/22 |
| 3,379,401 | A | * | 4/1968 | Pellegrino ...................... | 248/407 |
| 3,724,844 | A | * | 4/1973 | Olmstead et al. .............. | 482/61 |
| 3,931,991 | A | * | 1/1976 | Marchello ...................... | 280/295 |
| 4,057,182 | A | * | 11/1977 | Kolkhorst et al. ............. | 224/403 |
| 4,262,899 | A | * | 4/1981 | Alvarez .......................... | 482/61 |
| 4,411,461 | A | * | 10/1983 | Rosenberg ..................... | 293/108 |
| 5,222,707 | A | * | 6/1993 | Myers ......................... | 248/206.1 |
| 5,320,227 | A | * | 6/1994 | Minoura ......................... | 211/22 |
| 5,497,967 | A | * | 3/1996 | Gantois .......................... | 248/166 |
| 5,544,763 | A | * | 8/1996 | McClain ......................... | 211/22 |
| 2007/0138111 | A1 | * | 6/2007 | Schairer et al. ................ | 211/17 |
| 2010/0122958 | A1 | * | 5/2010 | Tsai ................................ | 211/22 |

* cited by examiner

*Primary Examiner* — Joshua J Michener
*Assistant Examiner* — Devin Barnett
(74) *Attorney, Agent, or Firm* — Alan Kamrath; Kamrath IP Lawfirm, P.A.

(57) ABSTRACT

A bicycle stand contains a base, a connecting member, and an adjusting plate. The base includes a placing area, a first extending section, a second extending section, and supporting plate. The connecting member includes a receiving portion, and the adjusting plate includes a positioning area. The locking area has a circular hole for retaining a wheel. The supporting plate has a connecting section, the connecting section has a recess, and the receiving portion has two shoulders, the adjusting plate includes a longitudinal slot with a plurality of notches. Thereby, the bicycle stand is applied to fix a bicycle based on a placed height of a rear fork of a wheel.

2 Claims, 7 Drawing Sheets

BICYCLE STAND

FIELD OF THE INVENTION

The present invention relates to a bicycle stand which is used to fix each wheel with a varying size at a suitable position of an adjusting plate.

BACKGROUND OF THE INVENTION

Figure 7:
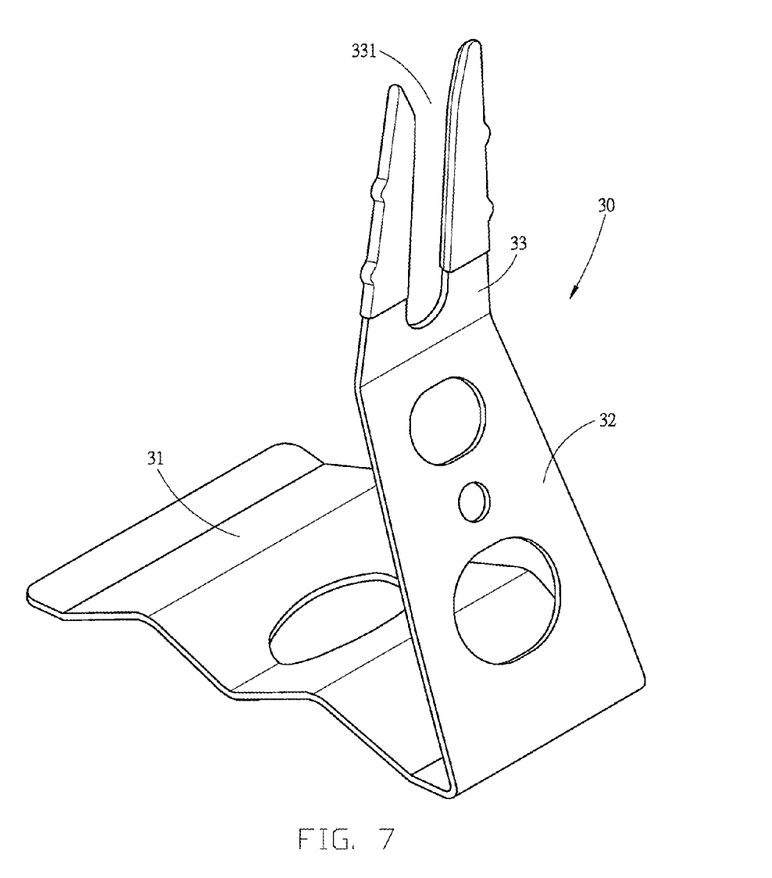
FIG. 7 is a perspective view of a conventional bicycle stand.

As shown in FIG. 7, a conventional bicycle stand 30 contains a base 31 concaving downwardly, and the base 31 having a supporting plate 35 extending upwardly from one side thereof, the supporting plate 32 having two fixing extensions 33 extending upwardly from a top end thereof and a slot 331 defined between the two extensions 33. However, the slot 331 of the bicycle stand 30 is fixed, so it is only used to fix a wheel with a fixed size.

The present invention has arisen to mitigate and/or obviate the afore-described disadvantages.

SUMMARY OF THE INVENTION

The primary object of the present invention is to provide a bicycle stand which is used to fix each wheel with a varying size at a suitable position of an adjusting plate so as to further fix the bicycle based on a placed height of a rear fork of a wheel.

Another object of the present invention is to provide bicycle stand in which the two first anti-slip elements of the first extending section and the two second-slip elements of the second extending section retain with a ground securely, and a distance is formed between the circular hole and the ground so as to retain the wheel fixedly by using the circular hole of the placing area of the base.

To obtain the above objectives, a bicycle stand contains a base including a placing area, a connecting member including a receiving portion, and an adjusting plate including a positioning area, the base also including a first extending section and a second extending section extending outwardly from two sides thereof, the base further including a supporting plate extending upwardly from one side thereof opposite to the first extending section, the locking area having a circular hole defined on a central portion thereof so as to retain a wheel.

The supporting plate has a connecting section extending upwardly from an upper end thereof, the connecting section having a recess defined thereon so as to insert the connecting member, and the receiving portion has two shoulders arranged on two sides thereof and connecting with the connecting section, the adjusting plate includes a longitudinal slot defined on a central portion thereof, and the longitudinal slot has a plurality of notches isometrically arranged therein, such that the adjusting plate is inserted into the receiving portion so that one of the plurality of notches matches with an adjustable knob, the adjustable knob has a first stopping segment extending outwardly from one side thereof, and the first stopping segment has a first pore defined therein so as to receive a resilient element, the adjustable knob also has a second stopping segment extending outwardly from another side thereof, the second stopping segment has a second pore defined therein and communicating with the first pore, wherein a diameter of the first stopping segment is larger than that of the second stopping segment, such that the adjusting plate inserts through the receiving portion of the connecting member so that the one of the plurality of notches communicates with a first aperture and a second aperture of the connecting member, the resilient element is inserted into the first pore so that the first stopping segment is inserted into the one of the plurality of notches, and the second stopping segment abuts against the one of the plurality of notches and the first aperture and the second aperture, hence when the adjustable knob is pulled outwardly, the first stopping segment disengages from the one of the plurality of notches, and then the adjusting plate moves vertically in the receiving portion of the connecting member and is fixed at a height.

DETAILED DESCRIPTION OF THE PREFERRED EMBODIMENTS

Figure 1:
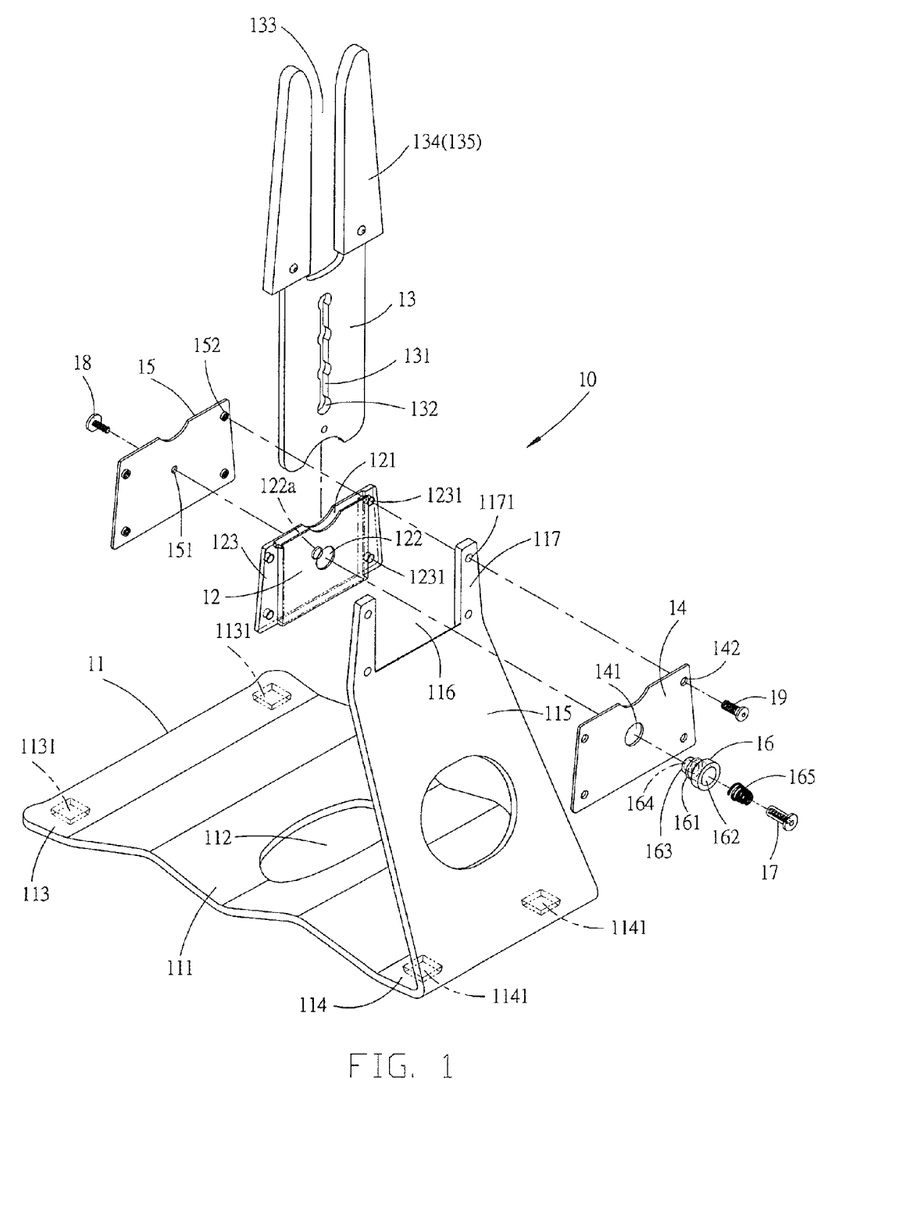
FIG. 1 is a perspective view showing the exploded components of a bicycle stand according to a preferred embodiment of the present invention.
Figure 2:
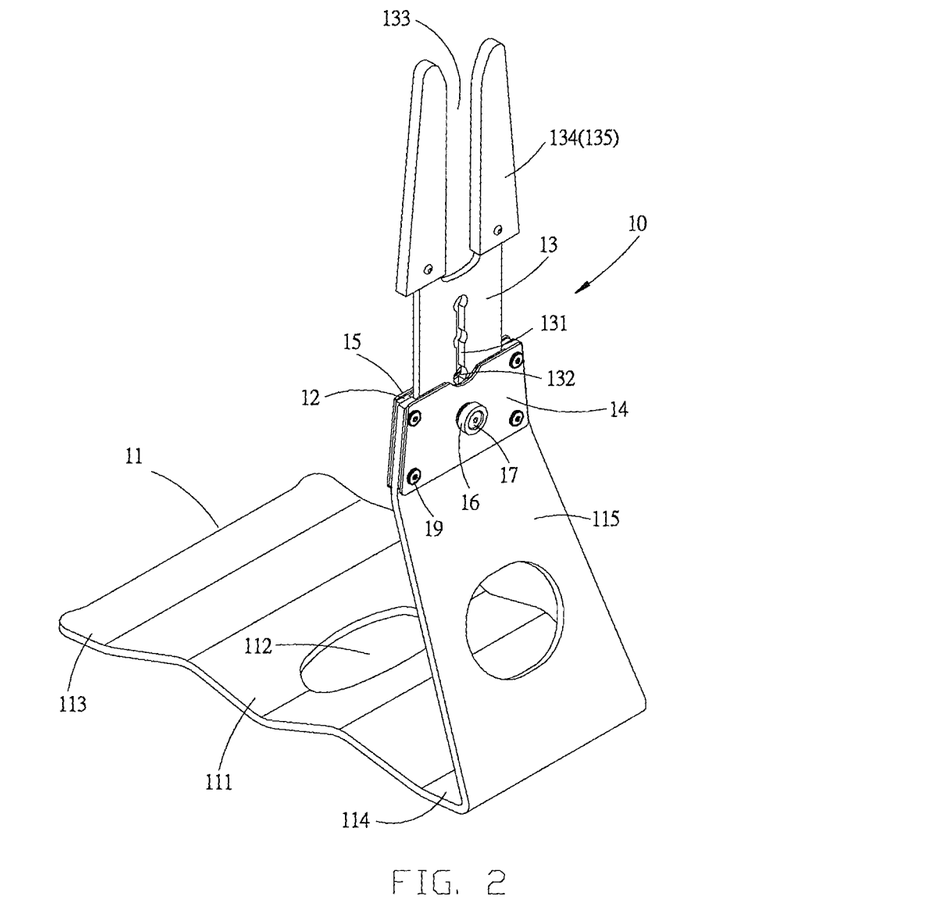
FIG. 2 is a perspective view showing the assembly of the bicycle stand according to the preferred embodiment of the present invention.
Figure 3:
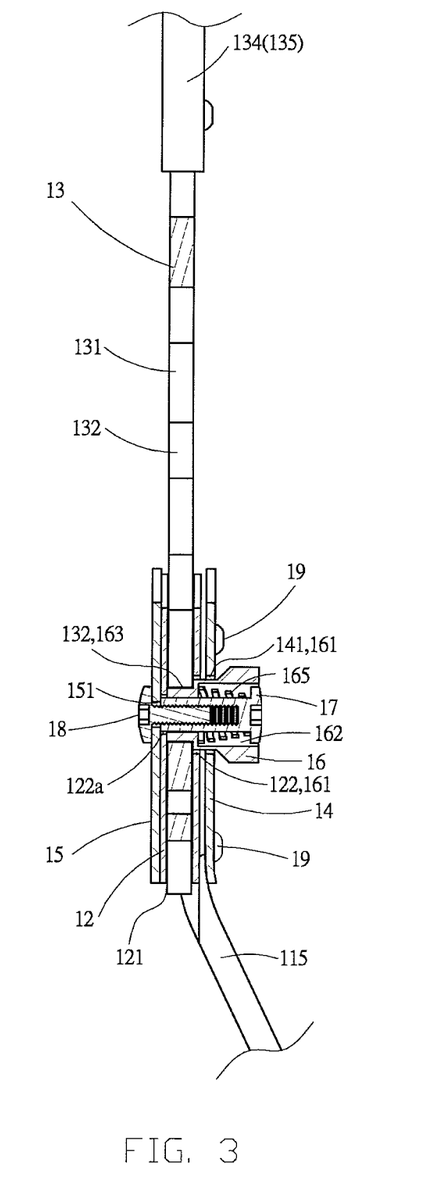
FIG. 3 is a cross sectional view showing the assembly of the bicycle stand according to the preferred embodiment of the present invention.

With reference to FIGS. 1-3, a bicycle stand 10 according to a preferred embodiment of the present invention comprises: a base 11, a connecting member 12, and an adjusting plate 13. The base 11 includes a placing area 111 defined on a central section thereof and concaves downwardly in a V shape so as to place a wheel of a bicycle, the placing area 111 has a circular hole 112 defined on a central portion thereof so as to retain the wheel. The base 11 also includes a first extending section 113 and a second extending section 114 extending outwardly from two sides of the base 11, and the first extending section 113 has two first anti-slip elements 1131 mounted on two sides thereof, the second extending section 114 has two second anti-slip elements 1141 disposed on two sides thereof. The base 11 further includes a supporting plate 115 extending upwardly from one side thereof opposite to the first extending section 113, and the supporting plate 115 has a connecting section 117 extending upwardly from an upper end thereof, the connecting section 117 having a U-shaped recess 116 defined thereon so as to insert the connecting member 12. The connecting member 12 includes a receiving portion 121 for inserting the adjusting plate 13, and the receiving portion 121 has two shoulders 123 arranged on two sides thereof and connecting with the connecting section 117, wherein each shoulder 123 has two first orifices 1231 defined thereon, the connecting section 117 has four second orifices 1171 for corresponding to four first orifices 1231 of the two shoulder 123. The connecting member 12 also includes a first aperture 122 and a second aperture 122a formed on a central portion thereof and matching with a third aperture 141 of a first fixing piece 14 and a fourth aperture 151 of a second fixing piece 15, wherein a diameter of the first aperture 122 is larger than that of the second aperture 122a, and the first fixing piece 14 has four third orifices 142 defined on four corners thereof, the second fixing piece 15 has four fourth orifices 152 formed on four corners thereof, such that the connecting member 12 is fixed into the U-shaped recess 116 of the supporting plate 115 so that the two shoulders 123 connects with the connecting section 117 and then couples with the first fixing piece 14 and the second fixing piece 15, thereafter plural first screwing elements 19 are screwed with four fourth orifices 152 of the second fixing piece 15 from the third third orifices 142 of the first fixing piece 14 via the four second orifices 1171 of the connecting section 117 and the four first orifices 1231 of the two shoulder 123, hence the connecting member 12 is fixed into the U-shaped recess 116 of the supporting plate 115, the third aperture 141 of the first fixing piece 14 corresponds to the first aperture 122 of the connecting member 12, and the fourth aperture 151 of the second fixing piece 15 corresponds to the second aperture 122a of the connecting member 12, such that the adjustable knob 16 is inserted into the third aperture 141, the first aperture 122, and the second aperture 122a. The adjustable knob 16 is a stepped projection and has a first stopping segment 161 extending outwardly from one side thereof, and the first stopping segment 161 has a first pore 162 defined therein so as to receive a resilient element 165, the adjustable knob 16 also has a second stopping segment 163 extending outwardly from another side thereof, the second stopping segment 163 has a second pore 164 defined therein and communicating with the first pore 162, wherein a diameter of the first stopping segment 161 is larger than that of the second stopping segment 163. The adjusting plate 13 includes a longitudinal slot 131 defined on a central portion thereof, and the longitudinal slot 131 has a plurality of notches 132 isometrically arranged therein, the adjusting plate 13 also includes two extensions 134 extending upwardly from a top end thereof, a positioning area 133 defined between the two extensions 134, and two protective sleeves 135 fitted on the two extensions 134.

Figure 4:
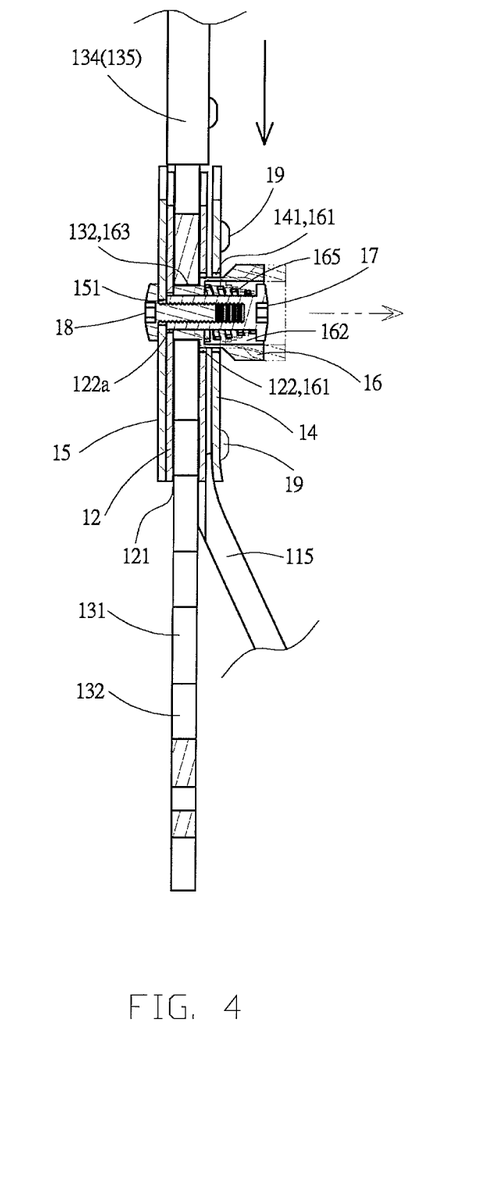
FIG. 4 is a cross sectional view showing the operation of the bicycle stand according to the preferred embodiment of the present invention.
Figure 5:
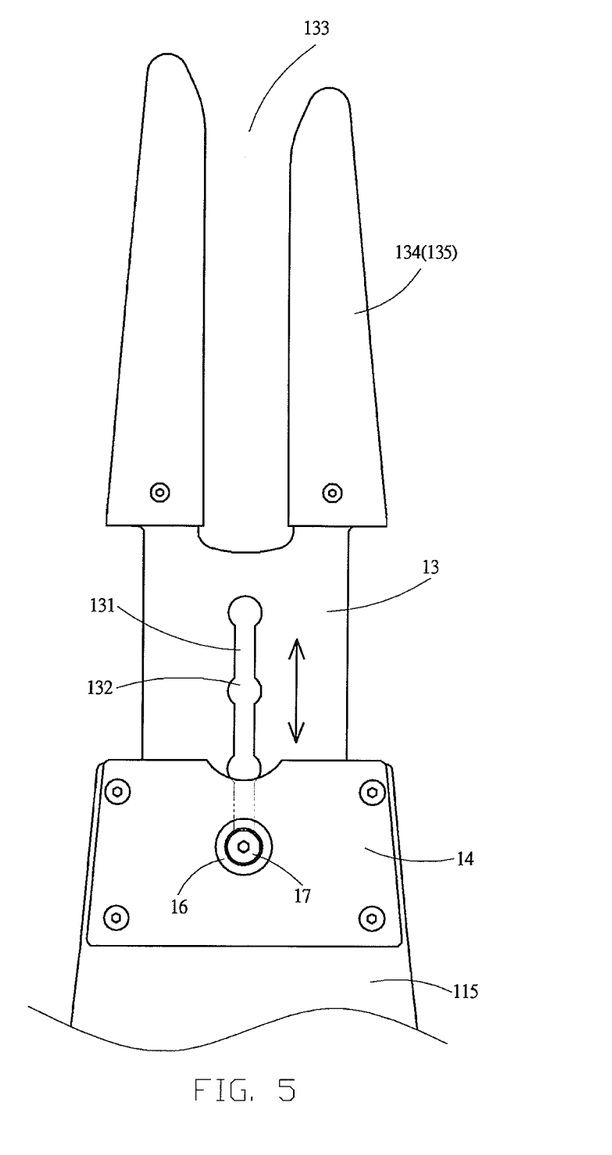
FIG. 5 is a plan view showing the operation of the bicycle stand according to the preferred embodiment of the present invention.
Figure 6:
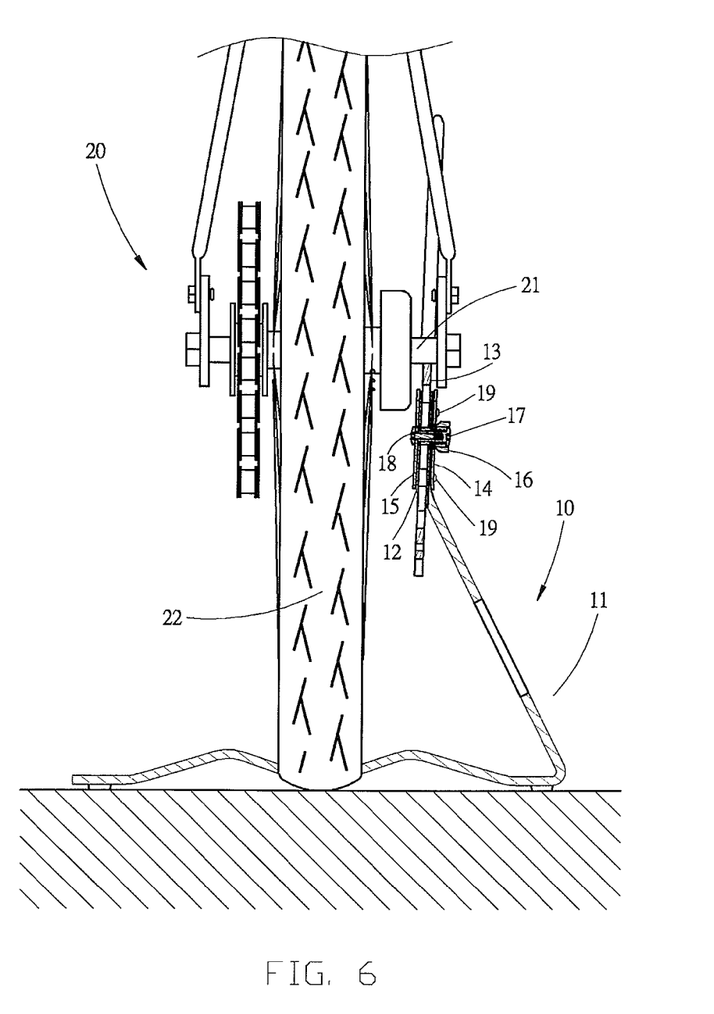
FIG. 6 is another plan view showing the operation of the bicycle stand according to the preferred embodiment of the present invention.

In operation, the adjusting plate 13 is inserted into the receiving portion 121 of the connecting member 12 so that one of the plurality of notches 132 of the longitudinal slot 131 communicates with the first aperture 122 and the second aperture 122a of the connecting member 12, the third aperture 141 of the first fixing piece 14, and the fourth aperture 151 of the second fixing piece 15. Thereafter, the resilient element 165 is inserted into the first pore 162 of the adjustable knob 16 so that the first stopping segment 161 inserts into the one of the plurality of notches 132 and abuts against the second aperture 122a, and the second stopping segment 163 inserts into the first aperture 122 of the connecting member 12 and the third aperture 141 of the first fixing piece 14 and is biased against the longitudinal slot 131, and then a second screwing element 17 is screwed with a third screwing element 18 so that when the adjustable knob 16 is pulled outwardly, the first stopping segment 161 disengages from the one of the plurality of notches 132 (as shown in FIG. 4), and then the adjusting plate 13 moves vertically in the receiving portion 121 of the connecting member 12, wherein the plurality of notches 132 are used to adjust a height of the adjusting plate 13 (as illustrated in FIG. 5), thereafter the adjusting plate 13 is moved back to an original position so as to retain the first stopping segment 161 by ways of the one of the plurality of notches 132. When a rear fork 21 of the bicycle 20 is placed in the positioning area 133 of the adjusting plate 13, each wheel 22 with a varying size is fixed at a suitable position of the adjusting plate 13. Thereby, the bicycle stand 10 is applied to fix the bicycle based on a placed height of the rear fork 21 of the wheel 22. Also, the two first anti-slip elements 1131 of the first extending section 113 and the two second-slip elements 1141 of the second extending section 114 retain with a ground securely, and a distance is formed between the circular hole 112 and the ground so as to retain the wheel 22 fixedly by using the circular hole 12.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A bicycle stand comprising:
a base including a placing area, a connecting member including a receiving portion, and an adjusting plate including a positioning area, the base also including a first extending section and a second extending section extending outwardly from two sides thereof, the base further including a supporting plate extending upwardly from one side thereof opposite to the first extending section, the placing area having a circular hole defined on a central portion thereof so as to retain a wheel, wherein the supporting plate has a connecting section extending upwardly from an upper end thereof, the connecting section has a recess defined thereon which is used to insert the connecting member in order to attach the connecting member to the supporting plate, and the receiving portion has two shoulders arranged on two sides thereof that are configured to abut the connecting section of the supporting plate, the adjusting plate includes a longitudinal slot defined on a central portion thereof, and the longitudinal slot has a plurality of notches isometrically arranged therein, such that the adjusting plate is inserted into the receiving portion so that one of the plurality of notches matches with an adjustable knob, the adjustable knob has a first stopping segment extending outwardly from one side thereof, and the first stopping segment has a first pore defined therein so as to receive a resilient element, the adjustable knob also has a second stopping segment extending outwardly from the first stopping segment, the second stopping segment has a second pore defined therein and communicating with the first pore, wherein a diameter of the first stopping segment is larger than that of the second stopping segment, such that the adjusting plate is inserted through the receiving portion of the connecting member so that the said one of the plurality of notches communicates with a first aperture and a second aperture of the connecting member, the resilient element is inserted into the first pore so that the first stopping segment is inserted into the said one of the plurality of the notches, and the second stopping segment abuts against the said one of the plurality of notches and the first aperture and the second aperture, hence when the adjustable knob is pulled outwardly, the first stopping segment disengages from the said one of the plurality of notches, and then the adjusting plate moves vertically in the receiving portion of the connecting member and is fixed at a height by inserting the first stopping segment of the adjustable knob within a corresponding notch from said plurality of notches.

2. The bicycle stand as claimed in claim 1, wherein the placing area is defined on a central section of the base and concaves downwardly in a V-shape, and the first extending section has two first anti-slip elements mounted on two sides thereof, the second extending section has two second anti-slip elements disposed on two sides thereof, the connecting member also includes the first aperture and the second aperture formed on a central portion thereof and matching with a third aperture of a first fixing piece and a fourth aperture of a second fixing piece, wherein a diameter of the third aperture is larger than that of the fourth aperture, and the first fixing piece has four third orifices defined on four corners thereof, the second fixing piece has four fourth orifices formed on four corners thereof, each shoulder has two first orifices defined thereon, the connecting section has four second orifices that correspond to four first orifices of the two shoulder, and a plurality of first screwing elements are inserted within the respective third orifices of the first fixing plate and extend through the respective second orifices of the connection section of the supporting plate and extend through the first orifices of the respective shoulders of the connecting member in order to fasten the plurality of screwing elements within the respective fourth orifices of the second fixing piece to secure and assemble the first fixing piece, the supporting plate, the connecting member, and the second fixing piece together, wherein the connecting member is fixed into the recess of the supporting plate, the third aperture of the first fixing piece aligns with the first aperture of the connecting member, and the fourth aperture of the second fixing piece aligns with the second aperture of the connecting member, such that the adjustable knob is inserted into the third aperture, the first aperture, and the second aperture, wherein the adjusting plate also includes two extensions extending upwardly from a top end thereof, a positioning area defined between the two extensions, and two protective sleeves fitted on the two extensions.

* * * * *